UNITED STATES PATENT OFFICE.

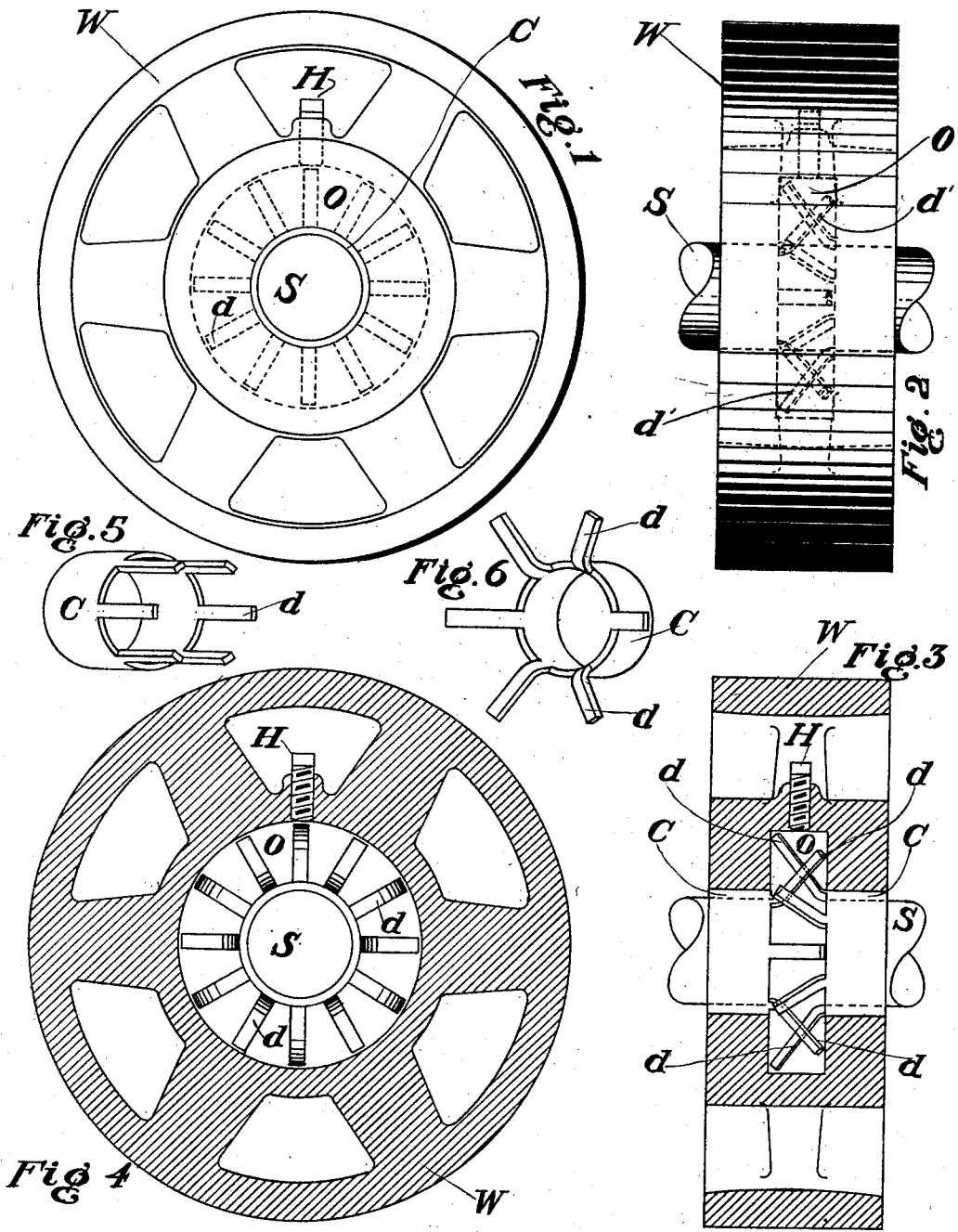

HAMILTON RICE, OF PAWTUCKET, RHODE ISLAND.

SELF-OILING PULLEY.

1,003,512.  Specification of Letters Patent.  Patented Sept. 19, 1911.

Application filed December 24, 1910. Serial No. 599,125.

*To all whom it may concern:*

Be it known that I, HAMILTON RICE, a citizen of the United States, residing at Pawtucket, in the county of Providence and State of Rhode Island, have invented certain new and useful Improvements in Self-Oiling Pulleys, of which the following is a specification.

My invention relates to improvements in self-oiling pulleys of the type known as "loose" pulleys, and the object of my invention is to provide a pulley which shall be made in a single piece and which shall contain within itself the means for furnishing its own lubrication for an extended period. These objects are realized by the device shown in the accompanying drawings in which—

Figure 1 represents a plan view of my pulley and of the self-oiling means contained therein. Fig. 2, a vertical edge view of the pulley. Fig. 3, a vertical section of the body of the pulley in a plane with the center line of the shaft S, together with a vertical elevation of the shaft and a portion of the oiling device. Fig. 4, a section of the pulley in a plane at right angles to the shaft on which the same rotates, showing also a plan of the automatic oiling device in place. Fig. 5, a removable fingered bushing before insertion into the pulley, and Fig. 6, the same bushing with its fingers bent approximately in the shape which they assume after insertion into the pulley.

The same letters refer to the same parts of my device throughout the several views.

In Fig. 1, W represents the rim of the pulley adapted to revolve upon the shaft S, and provided with the internal cavity O, the bushing C, provided with fingers $d$; and the screw H communicating by a threaded hole with the cavity O. The shape of the cavity O is approximately cylindrical, the curve of the cavity being roughly annular with the shaft S, but it is approximately rectangular in cross section in a vertical plane through the center line of the shaft as shown in Fig. 2 by the dotted outlines, and seen better in Fig. 3.

The dotted lines $d'$—$d'$ in Fig. 2, and the full lines $d$—$d$, $d$—$d$ in Fig. 3, represent the fingers of the bushing C in the cavity O, a plan view of which is shown also in Fig. 4.

Fig. 4 shows a vertical section through the pulley at right angles to the shaft S and disclosing also, as stated, a plan view of the fingers $d$—$d$, extending inwardly from the two bushings lying one each side of the central cavity O. These bushings are best shown in detail in Figs. 5 and 6, Fig. 5 showing the fingered bushing before insertion in the pulley, and Fig. 6 the same after insertion with the fingers $d$—$d$ as bent within the cavity O.

The various parts of my device are made of metal, or other equivalent material, the pulley W being preferably of cast iron, and the bushings C—C of brass or some other tough and malleable substance.

The pulley W is cast in a single piece, the cavity O being cored out in the form shown. The bushings C—C are provided with a plurality of fingers $d$—$d$ and the relative sizes of bushing, shaft and pulley are such that the bushings C—C are a driving fit within the pulley W and revoluble upon the shaft S after insertion in the pulley. The bushings are inserted into the pulley one at a time, the fingers $d$—$d$ being bent by the process of insertion before the pulley is mounted on the shaft, the bending of the fingers being such that their outermost extremities come approximately in contact with the lining walls of the cavity O as shown in Fig. 3. When both bushings are in place and the pulley is mounted upon the shaft S the cavity O is practically sealed with the exception of the tubular opening filled by the plug H, and the capillary space between the bushing and the shaft. The cavity O is filled with oil until the same comes nearly or quite to the bottom of the shaft S. As the pulley revolves upon the shaft, the oil driven by centrifugal force to all parts of the cavity O will strike and cling to the fingers $d$—$d$ and will run down the same until it reaches the capillary space between the bushing and the shaft, and this space will remain filled and lubricated by the oil so long as any remains in the reservoir O, and when the pulley stops, the oil remaining on the fingers will find its way to the same space. The quantity of oil running down the fingers $d$—$d$ is not sufficient to permit of a drip, but is sufficient to lubricate the surface between the bushing and the shaft.

As the bushings C—C are easily inserted and removed, it will be seen that they provide a means for compensating for wear, inasmuch as one set of bushings can be taken out and a new set inserted quickly and easily.

I am aware that prior to my invention self-lubricating pulleys have been in use provided with an internal reservoir and means for bringing oil in contact with the shaft, but I am not aware that any such pulley has been made in a single piece provided with removable bushings and utilizing the capillary attraction between the bushing and the shaft for the purpose of introducing lubrication therein.

While my bushings shown in the drawings each have six fingers d—d, the exact number is, of course, immaterial, and a sufficient number may be used to effectively lead the oil from the reservoir to the space between the bushing and the shaft.

Having now described my invention, what I claim and desire to secure by Letters Patent is:—

A self-oiling pulley, made in a single piece, and provided with an internal cavity adapted to hold oil, and having inserted therein the bushings C—C provided with a plurality of fingers d—d, the extremity of said fingers being approximately in contact with the inner walls of said cavity, said fingers operating to conduct oil from said cavity to the space between said bushings and the shaft, substantially as described.

In testimony whereof I affix my signature in presence of two witnesses.

HAMILTON RICE.

Witnesses:
 MELTON MCMAHON,
 THOMAS P. CORCORAN.

Copies of this patent may be obtained for five cents each, by addressing the "Commissioner of Patents, Washington, D. C."